(12) United States Patent
Kato et al.

(10) Patent No.: US 9,093,712 B2
(45) Date of Patent: Jul. 28, 2015

(54) ACTIVE MATERIAL, MANUFACTURING METHOD FOR ACTIVE MATERIAL, AND LITHIUM ION SECONDARY BATTERY

(75) Inventors: Tomohiko Kato, Tokyo (JP); Atsushi Sano, Tokyo (JP); Masaki Sobu, Tokyo (JP); Akinobu Nojima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 51 days.

(21) Appl. No.: 13/814,638

(22) PCT Filed: Jul. 21, 2011

(86) PCT No.: PCT/JP2011/066514
§ 371 (c)(1),
(2), (4) Date: Mar. 4, 2013

(87) PCT Pub. No.: WO2012/017826
PCT Pub. Date: Feb. 9, 2012

(65) Prior Publication Data
US 2013/0209871 A1 Aug. 15, 2013

(30) Foreign Application Priority Data
Aug. 6, 2010 (JP) .................... 2010-177432

(51) Int. Cl.
*H01M 4/1315* (2010.01)
*H01M 4/131* (2010.01)
*H01M 4/139* (2010.01)
*H01M 4/13915* (2010.01)
*H01M 4/1391* (2010.01)
*H01M 4/66* (2006.01)
(Continued)

(52) U.S. Cl.
CPC .......... *H01M 4/667* (2013.01); *C01G 45/1228* (2013.01); *C01G 51/50* (2013.01); *C01G 53/50* (2013.01); *H01M 4/505* (2013.01); *H01M 4/525* (2013.01); *H01M 10/0525* (2013.01); *H01M 10/0568* (2013.01); *C01P 2002/52* (2013.01); *C01P 2006/12* (2013.01); *C01P 2006/40* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

2003/0082453 A1  5/2003  Numata et al.
2003/0180620 A1  9/2003  Nakane et al.
2011/0031437 A1  2/2011  Nagase et al.

FOREIGN PATENT DOCUMENTS

JP  A-9-55211       2/1997
JP  A-2003-142101   5/2003
(Continued)

OTHER PUBLICATIONS

Oct. 18, 2011 International Search Report issued in International Application No. PCT/JP2011/066514 (with translation).

*Primary Examiner* — Cynthia K Walls
(74) *Attorney, Agent, or Firm* — Oliff PLC

(57) ABSTRACT

An active material having high capacity and excellent charging/discharging cycle durability at high potential is provided. The active material has a layered structure and is represented by the following composition formula (1):

$$Li_yNi_aCo_bMn_cM_dO_xF_{z1}P_{z2} \quad (1)$$

wherein the element M is at least one element selected from the group consisting of Al, Si, Zr, Ti, Fe, Mg, Nb, Ba and V, and $1.9 \leq (a+b+c+d+y) \leq 2.1$, $1.0 \leq y \leq 1.3$, $0 < a \leq 0.3$, $0 \leq b \leq 0.25$, $0.3 \leq c \leq 0.7$, $0 \leq d \leq 0.1$, $0.07 \leq z1 \leq 0.15$, $0.01 \leq z2 \leq 0.1$, and $1.9 \leq (x+z1) \leq 2.1$ are satisfied.

5 Claims, 2 Drawing Sheets

(51) Int. Cl.
*C01G 45/12* (2006.01)
*C01G 51/00* (2006.01)
*C01G 53/00* (2006.01)
*H01M 4/505* (2010.01)
*H01M 4/525* (2010.01)
*H01M 10/0525* (2010.01)
*H01M 10/0568* (2010.01)

(56) References Cited

FOREIGN PATENT DOCUMENTS

| JP | A-2004-6267 | 1/2004 |
| JP | A-2007-145695 | 6/2007 |
| JP | A-2009-218112 | 9/2009 |
| WO | WO 2009/128289 A1 | 10/2009 |

ACTIVE MATERIAL, MANUFACTURING METHOD FOR ACTIVE MATERIAL, AND LITHIUM ION SECONDARY BATTERY

TECHNICAL FIELD

The present invention relates to an active material, a manufacturing method for an active material, and a lithium ion secondary battery.

BACKGROUND ART

In recent years, the spread of various electric vehicles has been anticipated for solving environmental and energy problems. For an on-vehicle power source such as a motor driving power source, which is the key for practical application of such electric vehicles, the development of lithium ion secondary batteries has been extensively conducted. However, for widely spreading the battery as the on-vehicle power source, the battery needs to have higher performance and be less expensive. Moreover, the mileage per charge of an electric vehicle needs to be as long as that of a gasoline-powered vehicle. Thus, the higher energy battery has been desired.

For increasing the energy density of the battery, it is necessary to increase the amount of electricity that can be stored in a positive electrode and a negative electrode per unit mass. As a positive electrode material (active material for a positive electrode) that can meet this demand, a so-called solid-solution positive electrode has been examined. Above all, a solid solution including electrochemically inactive layered $Li_2MnO_3$ and electrochemically active layered $LiAO_2$ (A represents a transition metal such as Co or Ni) has been expected as a candidate for a high-capacity positive electrode material that can exhibit a high electric capacity of more than 200 mAh/g (see, for example, Patent Document 1). Moreover, as a positive electrode material, a general formula $Li_pN_xM_yO_z-P_bF_a$ has been known (see Patent Document 2), wherein N represents at least one element selected from the group consisting of Co, Mn, and Ni, and M represents at least one element selected from the group consisting of transition metal elements other than Co, Mn, and Ni, and alkaline earth metal elements, which contains at least Al.

PRIOR ART DOCUMENT

Patent Document

Patent Document 1: JP-A-9-55211
Patent Document 2: JP-A-2007-145695

SUMMARY OF THE INVENTION

Problems to be Solved by the Invention

The solid-solution positive electrode with $Li_2MnO_3$ described in Patent Document 1 has high discharge capacity. However, the use of this positive electrode at high charging/discharging potential leads to a problem in that repetition of charging/discharging causes easy deterioration in cycle characteristic. This results in problems that a lithium ion battery including such a solid-solution positive electrode has poor cycle durability under the use with high capacity and that the charge and discharge performed at high potential cause early deterioration. Moreover, the use of the positive electrode material described in Patent Document 2 causes a problem of lower battery capacity.

The present invention has been made in view of the above problems of the conventional art. It is an object of the present invention to provide an active material having high capacity and excellent charging/discharging cycle durability at high potential, a manufacturing method for an active material, and a lithium ion secondary battery.

Solutions to the Problems

An active material according to the present invention for achieving the above object has a layered structure and is represented by the following composition formula (1):

$$Li_yNi_aCo_bMn_cM_dO_xF_{z1}P_{z2} \tag{1}$$

wherein the element M is at least one element selected from the group consisting of Al, Si, Zr, Ti, Fe, Mg, Nb, Ba and V, and $1.9 \leq (a+b+c+d+y) \leq 2.1$, $1.0 \leq y \leq 1.3$, $0 < a \leq 0.3$, $0 \leq b \leq 0.25$, $0.3 \leq c \leq 0.7$, $0 \leq d \leq 0.1$, $0.07 \leq z1 \leq 0.15$, $0.01 \leq z2 \leq 0.1$, and $1.9 \leq (x+z1) \leq 2.1$ are satisfied.

A lithium ion secondary battery according to the present invention includes: a positive electrode having a positive electrode current collector and a positive electrode active material layer containing a positive electrode active material; a negative electrode having a negative electrode current collector and a negative electrode active material layer containing a negative electrode active material; a separator disposed between the positive electrode active material layer and the negative electrode active material layer; and an electrolyte in contact with the negative electrode, the positive electrode, and the separator. The positive electrode active material includes the active material according to the present invention.

The lithium ion secondary battery according to the present invention including the positive electrode active material layer containing the active material of the present invention has high capacity and is difficult to deteriorate in the charging/discharging cycle at high potential.

As the electrolyte included in the lithium ion secondary battery according to the present invention, a nonaqueous electrolyte in which $LiPF_6$ is dissolved can be used. Since the active material of the present invention is difficult to react with $LiPF_6$, the deterioration is difficult to occur. Therefore, the capacity and charging/discharging cycle durability of the lithium ion secondary battery including the active material of the present invention and $LiPF_6$ are considerably higher than those of a battery including a conventional active material and $LiPF_6$.

A manufacturing method for an active material of the present invention includes a step of forming an active material from a lithium compound by disposing the lithium compound on a surface of a positive electrode of a lithium ion secondary battery including a nonaqueous electrolyte in which $LiPF_6$ is dissolved and charging/discharging the lithium ion secondary battery once or multiple times, and the lithium compound has a layered structure and is represented by the following composition formula (2):

$$Li_yNi_aCo_bMn_cM_dO_x \tag{2}$$

wherein the element M is at least one element selected from the group consisting of Al, Si, Zr, Ti, Fe, Mg, Nb, Ba and V, and $1.9 \leq (a+b+c+d+y) \leq 2.1$, $1.0 \leq y \leq 1.3$, $0 < a \leq 0.3$, $0 \leq b \leq 0.25$, $0.3 \leq c \leq 0.7$, $0 \leq d \leq 0.1$, and $1.90 \leq x \leq 2.05$ are satisfied.

According to the manufacturing method for an active material according to the present invention, the active material according to the present invention represented by the composition formula (1) can be manufactured.

In the manufacturing method for an active material of the present invention, the temperature of the lithium ion secondary battery at the time of charging/discharging is preferably maintained at 0 to 40° C. Thus, the capacity and the charging/discharging cycle durability of the battery including the obtained active material can be easily improved.

Effects of the Invention

According to the present invention, the active material having high capacity and excellent charging/discharging cycle durability at high potential, the manufacturing method for an active material, and the lithium ion secondary battery can be provided.

DESCRIPTION OF EMBODIMENT

Figure 1:
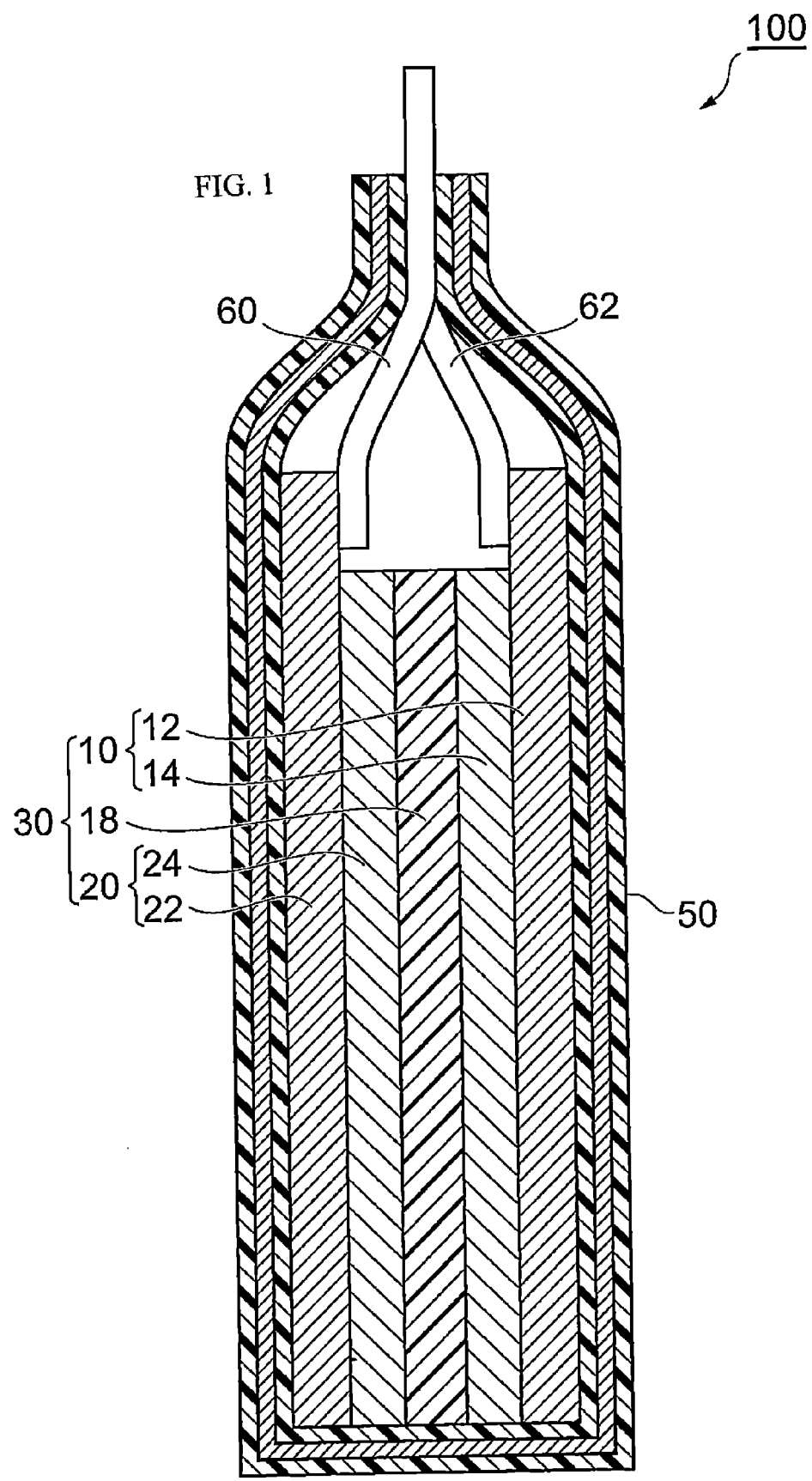
FIG. 1 is a schematic cross-sectional view of a lithium ion secondary battery including a positive electrode active material layer containing an active material formed from a precursor according to an embodiment of the present invention.
Figure 2:
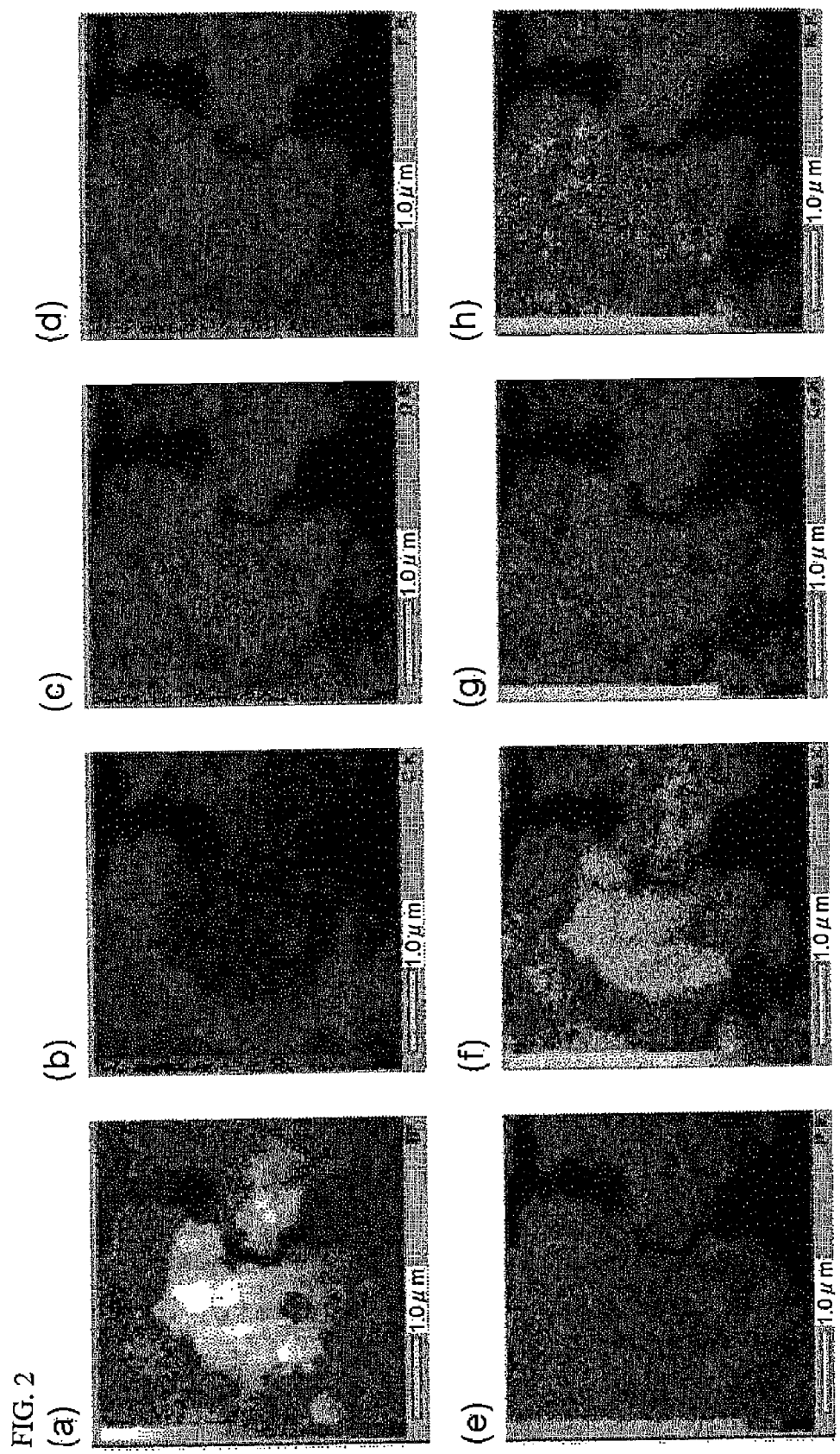
FIG. 2(a) is a photograph of an active material according to Example 1 of the present invention, which is taken with a transmission electron microscope (TEM)
FIG. 2(b) is a TEM-EDS image of carbon distributed uniformly in the active material shown in FIG. 2(a)
FIG. 2(c) is a TEM-EDS image of oxygen distributed uniformly in the active material shown in FIG. 2(a)
FIG. 2(d) is a TEM-EDS image of fluorine distributed uniformly in the active material shown in FIG. 2(a)
FIG. 2(e) is a TEM-EDS image of phosphorus distributed uniformly in the active material shown in FIG. 2(a)
FIG. 2(f) is a TEM-EDS image of manganese distributed uniformly in the active material shown in FIG. 2(a)
FIG. 2(g) is a TEM-EDS image of cobalt distributed uniformly in the active material shown in FIG. 2(a)
FIG. 2(h) is a TEM-EDS image of nickel distributed uniformly in the active material shown in FIG. 2(a).

An active material, a manufacturing method for an active material, and a lithium ion secondary battery according to one embodiment of the present invention are hereinafter described. Note that the present invention is not limited to the embodiment below.
(Active Material)

An active material of this embodiment has a layered structure and is a lithium-containing composite oxide represented by the following composition formula (1):

  (1)

wherein the element M is at least one element selected from the group consisting of Al, Si, Zr, Ti, Fe, Mg, Nb, Ba and V, and $1.9 \leq (a+b+c+d+y) \leq 2.1$, $1.0 \leq y \leq 1.3$, $0 < a \leq 0.3$, $0 \leq b \leq 0.25$, $0.3 \leq c \leq 0.7$, $0 \leq d \leq 0.1$, $0.07 \leq z1 \leq 0.15$, $0.01 \leq z2 \leq 0.1$, and $1.9 \leq (x+z1) \leq 2.1$ are satisfied.

The layered structure described herein is generally represented by $LiAO_2$ (A represents a transition metal such as Co, Ni, or Mn). In this layered structure, a lithium layer, a transition metal layer, and an oxygen layer are stacked in a uniaxial direction. A typical material thereof is a material of α-$NaFeO_2$ type, such as $LiCoO_2$ and $LiNiO_2$. These are rhombohedral-system materials, and belong to a space group R(-3)m from their symmetry. $LiMnO_2$ is an orthorhombic-system material, and belongs to a space group Pm2m from its symmetry. $Li_2MnO_3$ can also be represented by $Li[Li_{1/3}Mn_{2/3}]O_2$, and belongs to a space group C2/m of a monoclinic system. $Li_2MnO_3$ is a layered compound in which a Li layer, a $[Li_{1/3}Mn_{2/3}]$ layer, and an oxygen layer are stacked. The active material according to this embodiment is a solid solution of a lithium transition metal composite oxide, which is represented by $LiAO_2$. The metal element occupying the transition metal site may be Li. The "solid solution" is discriminated from a mixture of compounds. For example, a mixture such as a powder of $LiNi_{0.5}Mn_{0.5}O_2$ or a powder of $LiNi_{0.33}Co_{0.33}Mn_{0.34}O_2$ is not included in the "solid solution" although such a mixture apparently satisfies the composition formula (1). In the case of performing X-ray diffraction measurement on a simple mixture, different peak positions corresponding to each lattice constant are observed. Therefore, one peak is split into two or three peaks. Meanwhile, in the "solid solution", one peak is not split. Accordingly, the "solid solution" and the mixture can be discriminated from each other based on the presence or absence of the split of the peak in the X-ray diffraction measurement. The following description is made of the case where the active material has a space group R(-3)m structure of a rhombohedral system.

The active material represented by the composition formula (1) contains P and F. These P and F are diffused to reach the inside of the layered structure of the active material. Therefore, at high potential, the active material according to this embodiment is difficult to react with the electrolyte solution in which a nonaqueous electrolyte salt including F such as $LiBF_4$, $LiAsF_6$, or $LiPF_6$ is dissolved, whereby the deterioration is difficult to occur. As a result, the lithium ion secondary battery including the active material according to this embodiment and the nonaqueous electrolyte solution has high capacity and excellent charging/discharging cycle durability.
(Manufacturing Method for Active Material)

In the manufacture of the active material, first, a precursor (first precursor) of the active material is prepared. The precursor has the composition corresponding to the following composition formula (2):

  (2)

wherein the element M is at least one element selected from the group consisting of Al, Si, Zr, Ti, Fe, Mg, Nb, Ba and V, and $1.9 \leq (a+b+c+d+y) \leq 2.1$, $1.0 \leq y \leq 1.3$, $0 < a \leq 0.3$, $0 \leq b \leq 0.25$, $0.3 \leq c \leq 0.7$, $0 \leq d \leq 0.1$, and $1.90 \leq x \leq 2.05$ are satisfied.

The precursor of this embodiment is a material including, for example, Li, Ni, Co, Mn, M, and O. In a manner similar to the above composition formula (2), the molar ratio among Li, Ni, Co, Mn, M, and O is y:a:b:c:d:x. A mixture as a specific example of the precursor is obtained by mixing compounds of Li, Ni, Co, Mn, and M (for example, salts) and a compound containing O so as to satisfy the above molar ratio, and heating the mixture as necessary. One of the compounds included in the precursor may be formed of a plurality of elements selected from the group consisting of Li, Ni, Co, Mn, M, and O. Note that the molar ratio of O in the precursor is changed depending on the heating condition of the precursor (for example, the atmosphere and temperature). Accordingly, the molar ratio of O in the precursor may be out of the numeral value range of the above x.

The precursor can be obtained by mixing the following compounds so as to satisfy the molar ratio of the composition formula (2). Specifically, the precursor can be manufactured from the compounds below by a procedure such as crushing and mixing, thermal decomposition and mixing, precipitation reaction, or hydrolysis. In a particularly preferable method, a liquid material obtained by dissolving in a solvent such as water, a Mn compound, a Ni compound, and a Co compound, and a Li compound is mixed, stirred, and furthermore, heated. By drying this, the composite oxide (first precursor) which has uniform composition and is easily crystallized at low temperature can be easily manufactured as the precursor.

Li compound: lithium hydroxide monohydrate, lithium carbonate, lithium nitrate, lithium chloride, or the like.

Ni compound: nickel sulfate hexahydrate, nickel nitrate hexahydrate, nickel chloride hexahydrate, or the like.

Co compound: cobalt sulfate heptahydrate, cobalt nitrate hexahydrate, cobalt chloride hexahydrate, or the like.

Mn compound: manganese sulfate pentahydrate, manganese nitrate hexahydrate, manganese chloride tetrahydrate, manganese acetate tetrahydrate, or the like.

M compound: Al source, Si source, Zr source, Ti source, Fe source, Mg source, Nb source, Ba source, or V source (oxide, fluoride, or the like). For example, aluminum nitrate nonahydrate, aluminum fluoride, iron sulfate heptahydrate, silicon dioxide, zirconium nitrate oxide dihydrate, titanium sulfate hydrate, magnesium nitrate hexahydrate, niobium oxide, barium carbonate, vanadium oxide, or the like.

The raw-material mixture is adjusted by adding a sugar to a solvent in which the compounds are dissolved. The adjusted raw-material mixture may be further mixed and stirred, and heated. An acid may be added to the raw-material mixture for adjusting the pH as necessary. Although the kind of sugar is not restricted, the sugar is preferably glucose, fructose, sucrose, or the like in consideration of the accessibility and cost. Alternatively, a sugar acid may be added. Although the kind of sugar acid is not restricted, the sugar acid is preferably ascorbic acid, glucuronic acid, or the like in consideration of the accessibility and cost. The sugar and the sugar acid may be added simultaneously. Further, a synthetic resin soluble in hot water, such as polyvinyl alcohol, may be added.

In this embodiment, the total value (Ms) of the contents of the sugar and the sugar acid in the raw-material mixture of the first precursor is preferably adjusted to 0.08 to 2.20 mol % relative to the molar number of the active material obtained from the first precursor. In other words, the total value of the contents of the sugar and the sugar acid in the first precursor is preferably 0.08 to 2.20 mol % relative to the molar number of the active material obtained from the first precursor. The sugar added into the raw-material mixture of the first precursor becomes a sugar acid by an acid. This sugar acid forms a complex together with metal ions in the raw-material mixture of the first precursor. Also in the case where the sugar acid itself is added, the sugar acid forms a complex together with metal ions. By heating and stirring the raw-material mixture to which the sugar or the sugar acid is added, the metal ions are uniformly dispersed in the raw-material mixture. By drying this, the first precursor having uniform composition distribution can be easily obtained. When the Ms is smaller than 0.05%, the effect that the first precursor has uniform composition distribution tends to be small. When the Ms is larger than 2.20%, it is difficult to obtain the effect corresponding to the amount of the sugar or the sugar acid added. Accordingly, when the Ms is large, the manufacturing cost is simply increased.

The specific surface area of the first precursor is preferably 0.5 to 6.0 m²/g. Thus, the crystallization (sintering) of the first precursor easily progresses. As a result, the charging/discharging cycle durability is easily improved. When the specific surface area of the precursor is smaller than 0.5 m²/g, the particle diameter of the first precursor after the heating (particle diameter of the lithium compound) becomes larger. Accordingly, the composition distribution of the active material to be obtained finally tends to be non-uniform. When the specific surface area of the first precursor is larger than 6.0 m²/g, the amount of water absorption of the first precursor becomes larger. Accordingly, the heating step becomes difficult. When the amount of water absorption of the first precursor is large, the provision of a dry environment is necessary, which increases the cost for manufacturing the active material. Note that the specific surface area can be measured by a known BET type powder specific surface area measurement apparatus. When the specific surface area of the first precursor is out of the above range, the temperature at which the first precursor is crystallized tends to be higher. The specific surface area of the first precursor can be adjusted by a crushing method, a crushing medium, a crushing time, or the like.

The first precursor manufactured by the above method is heated. By heating the first precursor, a solid solution of the lithium compound (second precursor) having a layered structure and is represented by the following composition formula (2) can be obtained. The lithium compound represented by the following composition formula (2) functions as a positive electrode active material of a lithium ion secondary battery. Note that this lithium compound is different from the active material according to the present invention containing P and F.

$$Li_yNi_aCo_bMn_cM_dO_x \qquad (2)$$

In the above formula (2), the element M is at least one element selected from the group consisting of Al, Si, Zr, Ti, Fe, Mg, Nb, Ba and V, and $1.9 \leq (a+b+c+d+y) \leq 2.1$, $1.0 \leq y \leq 1.3$, $0 < a \leq 0.3$, $0 \leq b \leq 0.25$, $0.3 \leq c \leq 0.7$, $0 \leq d \leq 0.1$, and $1.90 \leq x \leq 2.05$ are satisfied.

The heating temperature for the first precursor is preferably 500 to 1000° C., more preferably 700 to 980° C. A heating temperature of the first precursor of less than 500° C. is not preferable because the sintering reaction of the first precursor does not progress sufficiently and the crystallinity of the lithium compound obtained is low. A heating temperature of the first precursor of more than 1000° C. is not preferable because the amount of evaporated Li from the sintered body becomes larger. This results in high tendency of generating the lithium compound having a composition lacking lithium.

The heating atmosphere for the first precursor preferably includes oxygen. Specifically, the atmosphere includes, for example, a mixture gas including an inert gas and oxygen, and an atmosphere including oxygen such as air. The heating time for the first precursor is preferably 30 minutes or more, and more preferably 1 hour or more.

The lithium compound (second precursor) is applied to a surface of the positive electrode of the lithium ion secondary battery. Thus, a layer of the lithium compound is formed. The lithium ion secondary battery includes a nonaqueous electrolyte in which $LiPF_6$ as an electrolyte salt is dissolved. This lithium ion secondary battery is charged and discharged once or multiple times. Through this charging/discharging step, P and F from $LiPF_6$ are diffused in the crystal structure of the lithium compound (second precursor) represented by the composition formula (2). As a result, the active material of this embodiment, which has a layered structure and is represented by the following composition formula (1), is obtained. In other words, by performing the charging/discharging step once or multiple times on the lithium ion secondary battery including the layer of the second precursor represented by the composition formula (2), the lithium ion secondary battery including the layer of the active material (positive electrode active material layer) represented by the following composition formula (1) is completed.

$$Li_yNi_aCo_bMn_cM_dO_xF_{z1}P_{z2} \qquad (1)$$

In the above formula (1), the element M is at least one element selected from the group consisting of Al, Si, Zr, Ti, Fe, Mg, Nb, Ba and V, and $1.9 \leq (a+b+c+d+y) \leq 2.1$, $1.0 \leq y \leq 1.3$, $0 < a \leq 0.3$, $0 \leq b \leq 0.25$, $0.3 \leq c \leq 0.7$, $0 \leq d \leq 0.1$, $0.07 \leq z1 \leq 0.15$, $0.01 \leq z2 \leq 0.1$, and $1.9 \leq (x+z1) \leq 2.1$ are satisfied.

The contents of F and P in the active material can be adjusted by the concentration of $LiPF_6$ in the nonaqueous electrolyte, or the number of times of the charging/discharging. The concentration of $LiPF_6$ in the nonaqueous electrolyte may be approximately 0.1 to 5 mol %, for example. The number of times of the charging/discharging may be approximately 1 to 5.

In the above charging/discharging step, the temperature of the lithium ion secondary battery is preferably maintained at 0 to 40° C. When the temperature of the battery is less than 0° C., it is likely that the diffusion of P and F to the inside of the lithium compound does not progress sufficiently. When the temperature of the battery is more than 40° C., it is likely that excessive P and F diffuse into the lithium compound. In either case, it is difficult to improve the capacity and the charging/discharging cycle characteristic of the battery. However, even if the temperature of the battery at the time of the charging/discharging is out of the above numerical value range, the active material of the present invention can be obtained.

The powder of the active material (positive electrode material and negative electrode material) preferably has a mean particle diameter of 100 μm or less. In particular, the mean particle diameter of the powder of the positive electrode active material is preferably 10 μm or less. In a nonaqueous electrolyte battery including such a microscopic positive electrode active material, the high output characteristic is improved.

For obtaining the powder of the active material having desired particle diameter and shape, a crusher or classifier is used. For example, a mortar, a ball mill, a bead mill, a sand mill, a vibration ball mill, a planetary ball mill, a jet mill, a counter jet mill, a swirling air flow type jet mill, or a sieve is used. At the time of crushing, wet crushing with water or an organic solvent such as hexane can be employed. The classifying method is not particularly limited. Depending on the purpose, a sieve, a pneumatic classifier, or the like is used for dry crushing or wet crushing.

(Lithium Ion Secondary Battery)

FIG. 1 illustrates a lithium ion secondary battery 100 according to this embodiment. The lithium ion secondary battery 100 includes a power generation element 30, an electrolyte solution containing lithium ions, a case 50, a negative electrode lead 60, and a positive electrode lead 62. The power generation element 30 includes a plate-like positive electrode 10, a plate-like negative electrode 20, and a plate-like separator 18. The negative electrode 20 and the positive electrode 10 face each other. The separator 18 is disposed adjacent to, and between the negative electrode 20 and the positive electrode 10. The case 50 houses the power generation element 30 and the electrolyte solution in a sealed state. One end of the negative electrode lead 60 is electrically connected to the negative electrode 20. The other end of the negative electrode lead 60 protrudes out of the case. One end of the positive electrode lead 62 is electrically connected to the positive electrode 10. The other end of the positive electrode lead 62 protrudes out of the case.

The negative electrode 20 includes a negative electrode current collector 22, and a negative electrode active material layer 24 formed on the negative electrode current collector 22. The positive electrode 10 includes a positive electrode current collector 12, and a positive electrode active material layer 14 formed on the positive electrode current collector 12. The separator 18 is disposed between the negative electrode active material layer 24 and the positive electrode active material layer 14.

The positive electrode active material contained in the positive electrode active material layer 14 has a layered structure and is represented by the composition formula (1).

Any of the negative electrode active materials having modes capable of depositing or storing lithium ions can be selected as the negative electrode active material used for a negative electrode of a nonaqueous electrolyte battery. For example, this material includes the following: a titanium-based material such as lithium titanate having a spinel type crystal structure typified by $Li[Li_{1/3}Ti_{5/3}]O_4$; an alloy-based material including Si, Sb, Sn, or the like; lithium metal; a lithium alloy (lithium metal-containing alloy such as lithium-silicon, lithium-aluminum, lithium-lead, lithium-tin, lithium-aluminum-tin, lithium-gallium, or wood's alloy); a lithium composite oxide (lithium-titanium); and silicon oxide. Further, this material includes an alloy and a carbon material (such as graphite, hard carbon, low-temperature burned carbon, and amorphous carbon) that can store and release lithium.

The positive electrode active material layer 14 and the negative electrode active material layer 24 may contain, in addition to the above main constituent components, a conductive agent, a binder, a thickener, a filler, or the like as a different constituent component.

The material of the conductive agent is not limited as long as the material is an electronically conductive material that does not adversely affect the battery performance. The conductive material as the conductive agent includes, in general, natural graphite (such as scaly graphite, flaky graphite, or amorphous graphite), artificial graphite, carbon black, acetylene black, Ketjen black, a carbon whisker, a carbon fiber, a metal (such as copper, nickel, aluminum, silver, or gold) powder, a metal fiber, a conductive ceramic material, and the like. Any of these conductive agents may be used alone. Alternatively, a mixture including any of these may be used.

The conductive agent is preferably acetylene black in particular from the viewpoint of the electron conductivity and coatability. The amount of the conductive agent added is preferably 0.1 to 50 wt. %, more preferably 0.5 to 30 wt. %, relative to the total weight of the positive electrode active material layer or the negative electrode active material layer. The use of acetylene black crushed into superfine particles each with a size of 0.1 to 0.5 μm is particularly preferable because the necessary amount of carbon can be reduced. A method of mixing these is physical mixing, ideally, uniform mixing. Therefore, dry or wet mixing using a powder mixer such as a V-type mixer, a S-type mixer, an automated mortar, a ball mill, or a planetary ball mill can be employed.

As the binder, generally, a single material of, or a mixture including two or more of the following can be used: thermoplastic resins such as polytetrafluoroethylene (PTFE), polyvinylidene fluoride (PVDF), polyethylene, and polypropylene; and rubber-elastic polymers such as ethylene-propylene-diene terpolymer (EPDM), sulfonated EPDM, styrene butadiene rubber (SBR), and fluorine rubber. The amount of the binder added is preferably 1 to 50 wt. %, more preferably 2 to 30 wt. %, relative to the total weight of the positive electrode active material layer or the negative electrode active material layer.

As the thickener, generally, a single material of, or a mixture including two or more of the following can be used: polysaccharides such as carboxyl methyl cellulose and methyl cellulose. The functional group of the thickener having a functional group which reacts with lithium like the polysaccharide is preferably deactivated by methylation or the like. The amount of the thickener added is preferably 0.5 to 10 wt. %, more preferably 1 to 2 wt. %, relative to the total weight of the positive electrode active material layer or the negative electrode active material layer.

As the material of the filler, any material is applicable as long as the battery performance is not adversely affected. As such a material, generally, an olefin-based polymer such as polypropylene or polyethylene, amorphous silica, alumina, zeolite, glass, carbon, or the like is used. The amount of the filler added is preferably 30 wt. % or less relative to the total weight of the positive electrode active material layer or the negative electrode active material layer.

The positive electrode active material layer or the negative electrode active material layer is manufactured suitably as follows. That is, a mixture is obtained by kneading the main constituent component and the other materials. This mixture is mixed with an organic solvent such as N-methylpyrrolidone or toluene. The resulting mixture solution is heated for approximately 2 hours at approximately 50° C. to 250° C. after the solution is applied or pressed onto the current collector. The method of applying the solution includes, for example, roller coating using an applicator roll or the like, screen coating, a doctor blade method, spin coating, or a method using a bar coater or the like. The method of applying the solution is not limited to these. The mixture solution is preferably applied to have an arbitrary thickness and an arbitrary shape.

For the current collector of the electrode, iron, copper, stainless steel, nickel, and aluminum can be used. The shape thereof may be a sheet, a foam, a mesh, a porous body, an expandable lattice, or the like. Further, a current collector provided with a hole having an arbitrary shape may be used.

A material generally suggested as the material for use in a lithium battery or the like can be used as a nonaqueous electrolyte. For example, a nonaqueous solvent used as the nonaqueous electrolyte includes: cyclic carbonate esters such as propylene carbonate, ethylene carbonate, butylene carbonate, chloroethylene carbonate, and vinylene carbonate; cyclic esters such as γ-butyrolactone and γ-valerolactone; chain carbonates such as dimethyl carbonate, diethyl carbonate, and ethyl methyl carbonate; chain esters such as methyl formate, methyl acetate, and methyl butyrate; tetrahydrofuran or derivatives thereof; ethers such as 1,3-dioxane, 1,4-dioxane, 1,2-dimethoxyethane, 1,4-dibutoxyethane, and methyl diglyme; nitriles such as acetonitrile and benzonitrile; dioxolane or derivatives thereof; and ethylene sulfide, sulfolane, sultone, or derivatives thereof. Any of these may be used alone, or two or more of these may be used as a mixture. The nonaqueous electrolyte is not limited to these.

Moreover, a combination including an electrolyte solution and a solid electrolyte may be used. As the solid electrolyte, a crystalline or amorphous inorganic solid electrolyte can be used. As the crystalline inorganic solid electrolyte, thio-LISICON may be used. Typical thio-LISICON is LiI, $Li_3N$, $Li_{1+x}M_xTi_{2-x}(PO_4)_3$ (M=Al, Sc, Y, or La), $Li_{0.5-3x}R_{0.5+x}TiO_3$ (R=La, Pt; Nd, or Sm), or $Li_{4-x}Ge_{1-x}P_xS_4$. The applicable amorphous inorganic solid electrolyte includes, for example, $LiI$—$Li_2O$—$B_2O_5$, $Li_2O$—$SiO_2$, $LiI$—$Li_2S$—$B_2S_3$, $LiI$—$Li_2S$—$SiS_2$, and $Li_2S$—$SiS_2$—$Li_3PO_4$.

For example, the electrolyte salt used for the nonaqueous electrolyte includes: an inorganic ion salt containing one kind of lithium (Li), sodium (Na), and potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$ or KSCN; and an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phtalate, lithium stearyl sulfonate, lithium octyl sulfonate, or lithium dodecyl benzene sulfonate. Any of these ionic compounds can be used alone, or two or more kinds thereof may be used as a mixture. In particular, the active material of this embodiment is difficult to chemically react with an electrolyte salt including F, such as $LiBF_4$, $LiAsF_6$, or $LiPF_6$, and has high durability.

Further, a mixture obtained by mixing $LiPF_6$ and a lithium salt including a perfluoroalkyl group such as $LiN(C_2F_5SO_2)_2$ is preferably used. This can decrease the viscosity of the electrolyte further. Therefore, the low-temperature characteristic can be further improved. Moreover, the self-discharge can be suppressed.

As the nonaqueous electrolyte, an ambient temperature molten salt or ionic liquid may be used.

The concentration of the electrolyte salt in the nonaqueous electrolyte is preferably 0.1 mol/l to 5 mol/l, and more preferably 0.5 mol/l to 2.5 mol/l. This can surely provide the nonaqueous electrolyte battery having high battery characteristics.

As the separator for the nonaqueous electrolyte battery, a porous film and a nonwoven fabric exhibiting excellent high-rate discharge performance, and the like are preferably used alone or in combination. The material used for the separator for the nonaqueous electrolyte battery includes, for example, a polyolefin-based resin typified by polyethylene and polypropylene, a polyester-based resin typified by polyethylene terephthalate and polybutylene terephthalate, polyvinylidene fluoride, vinylidene fluoride-hexafluoropropylene copolymer, vinylidene fluoride-perfluorovinylether copolymer, vinylidene fluoride-tetrafluoroethylene copolymer, vinylidene fluoride-trifluoroethylene copolymer, vinylidene fluoride-fluoroethylene copolymer, vinylidene fluoride-hexafluoroacetone copolymer, vinylidene fluoride-ethylene copolymer, vinylidene fluoride-propylene copolymer, vinylidene fluoride-trifluoropropylene copolymer, vinylidene fluoride-tetrafluoroethylene-hexafluoropropylene copolymer, and vinylidene fluoride-ethylene-tetrafluoroethylene copolymer.

The porosity of the separator for the nonaqueous electrolyte battery is preferably 98 vol. % or less from the viewpoint of the strength. From the viewpoint of the charging/discharging characteristic, the porosity is preferably 20 vol. % or more.

As the separator for the nonaqueous electrolyte battery, for example, a polymer gel including the electrolyte and a polymer such as acrylonitrile, ethylene oxide, propylene oxide, methyl methacrylate, vinyl acetate, vinyl pyrrolidone, or polyvinylidene fluoride may be used. The use of the gel-form nonaqueous electrolyte can provide an effect of preventing the liquid leakage.

The preferred embodiment of the present invention has been described in detail. However, the present invention is not limited to the above embodiment.

For example, the shape of the nonaqueous electrolyte secondary battery is not limited to the shape illustrated in FIG. 1. For example, the shape of the nonaqueous electrolyte secondary battery may be square, elliptical, coin-like, button-like, or sheet-like.

The active material of this embodiment can be used also as the electrode material of an electrochemical element other than the lithium ion secondary battery. Such an electrochemical element includes a secondary battery other than a lithium ion secondary battery such as a metal lithium secondary battery. In this metal lithium secondary battery, the electrode having the active material obtained according to the present invention is used as a positive electrode, and metal lithium is used as a negative electrode. Such an electrochemical element includes an electrochemical capacitor such as a lithium capacitor. These electrochemical elements can be used for a power source in self-running micromachines, IC cards, or the like or for a dispersed power source arranged on a printed board or in a printed board.

EXAMPLES

The present invention is further described more specifically based on examples and comparative examples below. Note that the present invention is not limited to the examples below.

Example 1

Production of First Precursor

In distilled water, 12.80 g of lithium nitrate, 3.50 g of cobalt nitrate hexahydrate, 24.20 g of manganese nitrate hexahydrate, and 7.55 g of nickel nitrate hexahydrate were dissolved to give a raw-material mixture of the first precursor. Into this raw-material mixture were added 0.3 g of glucose and 1 ml of nitric acid, and further 15 ml of polyvinyl alcohol (1 wt. % aqueous solution). This raw-material mixture was stirred on a hot plate heated to 200° C. until the distilled water was vaporized. This resulted in a black powder (first precursor of Example 1). In other words, the first precursor of Example 1 was obtained by evaporation to dryness of the raw-material mixture. The molar numbers of Li, Ni, Co, and Mn contained in the first precursor were adjusted so as to correspond to 0.15 mol of $Li_{1.2}Ni_{0.17}Co_{0.08}Mn_{0.55}O_2$ by adjusting the mixing amounts of lithium nitrate, nickel nitrate hexahydrate, cobalt nitrate, and manganese nitrate hexahydrate in the raw-material mixture. In other words, the molar number of each element in the raw-material mixture was adjusted so that 0.15 mol of $Li_{1.2}Ni_{0.17}Co_{0.08}Mn_{0.55}O_2$ was generated from the first precursor of Example 1. Relative to the molar number of 0.15 mol of the active material obtained from the first precursor of Example 1, 0.3 g (0.00167 mol) of glucose added to the raw-material mixture accounted for 1.11 mol %.

[Production of Second Precursor]

The first precursor was crushed for approximately 10 minutes in a mortar. The first precursor was then heated in the atmospheric air for 10 hours at 900° C., thereby providing the lithium compound (second precursor) of Example 1. The crystal structure of the lithium compound of Example 1 was analyzed by a powder X-ray diffraction method. The active material of Example 2 was confirmed to have the main phase of the space group R(-3)m structure of a rhombohedral system. Moreover, the diffraction peak peculiar to the space group $C_2/m$ structure of a monoclinic crystal system of $Li_2MnO_3$ type was observed at a portion of the pattern of the X-ray diffraction of the active material of Example 2 that is in accordance with 2θ in the vicinity of 20 to 25°.

As a result of analyzing the composition by an inductively coupled plasma method (ICP method), the composition of the lithium compound (second precursor) of Example 1 is $Li_{1.2}Ni_{0.17}Co_{0.08}Mn_{0.55}O_2$. It has also been confirmed that the molar ratio of the metal elements included in the second precursor of Example 1 matches the molar ratio of the metal elements included in the first precursor of Example 1. In other words, it was confirmed that the composition of the lithium compound (second precursor) obtained from the first precursor could be accurately controlled by adjusting the molar ratio of the metal elements in the first precursor.

[Production of Positive Electrode]

A coating for the positive electrode was prepared by mixing the lithium compound (second precursor) of Example 1, a conductive auxiliary agent, and a solvent including a binder. This coating for the positive electrode was applied to an aluminum foil (thickness: 20 μm) as a positive electrode current collector by a doctor blade method. Then, the coating for the positive electrode was dried at 100° C. and rolled. Thus, the positive electrode including the layer of the lithium compound (second precursor) and the positive electrode current collector was obtained. As the conductive auxiliary agent, carbon black (DAB50, manufactured by DENKI KAGAKU KOGYO KABUSHIKI KAISHA) and graphite (KS-6, manufactured by TIMCAL) were used. As the solvent including the binder, N-methyl-2-pyrrolidinone (KF7305, manufactured by KUREHA CORPORATION) in which PVDF was dissolved was used.

[Production of Negative Electrode]

A coating for the negative electrode was prepared by a method similar to the method for forming the coating for the positive electrode except that natural graphite was used instead of the second precursor of Example 1 and that only carbon black was used as the conductive auxiliary agent. This coating for the negative electrode was applied to a copper foil (thickness: 16 μm) as a negative electrode current collector by a doctor blade method. After that, the coating for the negative electrode was dried at 100° C. and rolled. This has provided the negative electrode having the negative electrode active material layer and the negative electrode current collector.

[Production of Lithium Ion Secondary Battery]

The positive electrode, the negative electrode, and the separator (microporous film made of polyolefin) produced as above were cut into predetermined dimensions. The positive electrode and the negative electrode each had a portion where the coating for the electrode was not applied, so that the portion is used for welding an external leading-out terminal. The positive electrode, the negative electrode, and the separator were stacked in this order. For stacking the positive electrode, the negative electrode, and the separator while avoiding the displacement from one another, these were fixed by applying a small amount of hot-melt adhesive (ethylene-methacrylic acid copolymer, EMAA) thereto. To each of the positive electrode and the negative electrode, an aluminum foil (with a width of 4 mm, a length of 40 mm, and a thickness of 100 μm) or a nickel foil (with a width of 4 mm, a length of 40 mm, and a thickness of 100 μm) was welded with ultrasonic waves as an external leading-out terminal. Around this external leading-out terminal, polypropylene (PP) as grafted maleic anhydride was wound and thermally adhered. This is to improve the sealing property between the external terminal and an exterior body. As the exterior body of the battery, an aluminum laminated material including a PET layer, an Al layer, and a PP layer was used. Into this exterior body of the battery, a battery element as the stacked positive electrode, negative electrode, and separator is sealed. The thicknesses of the PET layer, the Al layer, and the PP layer were 12 μm, 40 μm, and 50 μm, respectively. Note that PET stands for polyethylene terephthalate and PP stands for polypropylene. In the production of the exterior body of the battery, the PP layer was disposed inside the exterior body. Into this exterior body, the battery element was put and an appropriate amount of electrolyte solution was added. Further, the exterior body was sealed to vacuum. Thus, the lithium ion secondary battery including the lithium compound according to Example 1 was produced. As the electrolytic solution, a mixed solvent including ethylene carbonate (EC) and dimethylcarbonate (DMC), in which 1 M (1 mol/L) $LiPF_6$ was dissolved, was used. The volume ratio between EC and DMC in the mixed solvent was EC:DMC=30:70.

[Production of Active Material]

The battery was charged at a constant current of 30 mA/g up to 4.6 V. Then, this battery was discharged at a constant current of 30 mA/g down to 2.0 V. The temperature of the battery in the charging/discharging step was adjusted to 25° C. After the charging/discharging step, the active material was formed on a surface of the positive electrode current collector. This active material was subjected to ICP analysis and X-ray fluorescence analysis. The result of the analysis confirmed that the active material of Example 1 represented by $Li_{1.2}Ni_{0.17}Co_{0.08}Mn_{0.55}O_{1.9}F_{0.08}P_{0.08}$, was formed on the surface of the positive electrode current collector after the charging/discharging step. In other words, it was confirmed that the active material of Example 1 was formed by introducing P and F in the electrolyte into the lithium compound (second precursor) of Example 1 in the charging/discharging step.

[Measurement of Electric Characteristic]

The battery of Example 1 after the charging/discharging step was charged at a constant current of 30 mA/g up to 4.6 V. Then, this battery was discharged at a constant current of 30 mA/g down to 2.0 V. The discharge capacity of Example 1 was 230 mAh/g. A cycle test was performed in which this charging/discharging cycle was repeated for 100 times. The test was performed at 25° C. When the initial discharge capacity of the battery of Example 1 was assumed 100%, the discharge capacity thereof after 100 cycles was 92%. The percentage of the discharge capacity after the 100 cycles relative to 100% of the initial discharge capacity is called cycle characteristic below. A high cycle characteristic represents the excellent charging/discharging cycle durability of the battery.

Examples 2 to 16, 29 and 30, and Comparative Examples 1, 3 and 17

In Examples 2 to 16, 29 and 30, and Comparative Examples 1, 3 and 17, each lithium compound (second precursor) represented by the composition formula (2) shown in Tables 1 to 3 below was produced by adjusting the composition of the raw-material mixture of the first precursor.

In Example 2, the concentration of $LiPF_6$ in the electrolyte solution included in the lithium ion secondary battery was adjusted to 1.5 M before the charging/discharging step.

In Example 3, the electrolyte included in the lithium ion secondary battery was prepared before the charging/discharging step. This electrolyte is obtained by mixing an electrolyte solution A and an electrolyte solution B at a volume ratio of electrolyte solution A:electrolyte solution B=70:30. The electrolyte solution A is a mixed solvent of EC and DMC, in which 1 M (1 mol/L) $LiPF_6$ is dissolved. The electrolyte solution B is a mixed solvent of EC and DMC, in which 1 M (1 mol/L) $LiBF_4$ is dissolved.

The electrolyte included in the lithium ion secondary battery was prepared before the charging/discharging step in Comparative Example 1. This electrolyte was obtained by mixing the electrolyte solution A, the electrolyte solution B, and an electrolyte solution C at a volume ratio of electrolyte solution A:electrolyte solution B:electrolyte solution C=40:30:30. The electrolyte solution A is a mixed solvent of EC and DMC, in which 1 M (1 mol/L) $LiPF_6$ is dissolved. The electrolyte solution B is a mixed solvent of EC and DMC, in which 1 M (1 mol/L) $LiBF_4$ is dissolved. The electrolyte solution C is a mixed solvent of EC and DMC, in which 1 M (1 mol/L) $LiClO_4$ is dissolved.

In Example 4, aluminum nitrate nonahydrate was used as an Al source of the raw-material mixture of the first precursor. In Example 5, silicon dioxide was used as a Si source of the raw-material mixture of the first precursor. In Example 6, zirconium nitrate oxide dihydrate was used as a Zr source of the raw-material mixture of the first precursor. In Example 7, titanium sulfate hydroxide was used as a Ti source of the raw-material mixture of the first precursor. In Example 8, magnesium nitrate hexahydrate was used as a Mg source of the raw-material mixture of the first precursor. In Example 9, niobium oxide was used as a Nb source of the raw-material mixture of the first precursor. In Example 10, barium carbonate was used as a Ba source of the raw-material mixture of the first precursor. In Example 11, vanadium oxide was used as a V source of the raw-material mixture of the first precursor. In Example 30, iron sulfate heptahydrate was used as a Fe source of the raw-material mixture of the precursor.

Except for the above matter, a method similar to that of Example 1 was employed to produce the first precursors, the lithium compounds (second precursors), the active materials, and the lithium ion secondary batteries of Examples 2 to 16, 29 and 30 and Comparative Examples 1, 3 and 17.

The composition and crystal structure of each of the second precursors and the active materials of Examples 2 to 16, 29 and 30 and Comparative Examples 1, 3 and 17 were analyzed by a method similar to that of Example 1. The discharge capacity and the cycle characteristic of the batteries of Examples 2 to 16, 29 and 30 and Comparative Examples 1, 3 and 17 were evaluated by a method similar to that of Example 1. The results are shown in Tables 1 to 3. In the tables below, a battery having a capacity of 215 mAh/g or more and a cycle characteristic of 88% or more is evaluated as "A". A battery having a capacity of less than 215 mAh/g and a battery having a cycle characteristic of less than 88% are evaluated as "F".

TABLE 1

| | composition formula | | cycle | | |
| --- | --- | --- | --- | --- | --- |
| | (2): lithium compound (second precursor) | (1): active material | capacity mAh/g | characteristic % | evaluation |
| Example 1 | $Li_{1.2}Ni_{0.17}Co_{0.08}Mn_{0.55}O_{2.0}$ | $Li_{1.2}Ni_{0.17}Co_{0.08}Mn_{0.55}O_{1.9}F_{0.08}P_{0.08}$ | 230 | 92 | A |
| Example 2 | $Li_{1.2}Ni_{0.17}Co_{0.08}Mn_{0.55}O_{2.0}$ | $Li_{1.2}Ni_{0.17}Co_{0.08}Mn_{0.55}O_{1.88}F_{0.14}P_{0.1}$ | 223 | 93 | A |
| Example 3 | $Li_{1.2}Ni_{0.17}Co_{0.08}Mn_{0.55}O_{2.0}$ | $Li_{1.2}Ni_{0.17}Co_{0.08}Mn_{0.55}O_{1.9}F_{0.07}P_{0.02}$ | 230 | 92 | A |
| Comparative Example 1 | $Li_{1.2}Ni_{0.17}Co_{0.08}Mn_{0.55}O_{2.0}$ | $Li_{1.2}Ni_{0.17}Co_{0.08}Mn_{0.55}O_{1.9}F_{0.05}P_{0.008}$ | 220 | 86 | F |

TABLE 2

| | Composition formula | | capacity mAh/g | cycle % | evaluation |
|---|---|---|---|---|---|
| | (2): lithium compound (second precursor) | (1): active material | | | |
| Example 4 | $Li_{1.2}Ni_{0.16}Co_{0.08}Mn_{0.55}Al_{0.01}O_{2.0}$ | $Li_{1.2}Ni_{0.16}Co_{0.08}Mn_{0.55}Al_{0.01}O_{1.9}F_{0.08}P_{0.08}$ | 225 | 93 | A |
| Example 5 | $Li_{1.2}Ni_{0.16}Co_{0.08}Mn_{0.55}Si_{0.01}O_{2.0}$ | $Li_{1.2}Ni_{0.16}Co_{0.08}Mn_{0.55}Si_{0.01}O_{1.9}F_{0.08}P_{0.08}$ | 228 | 93 | A |
| Example 6 | $Li_{1.2}Ni_{0.16}Co_{0.08}Mn_{0.55}Zr_{0.01}O_{2.0}$ | $Li_{1.2}Ni_{0.16}Co_{0.08}Mn_{0.55}Zr_{0.01}O_{1.9}F_{0.08}P_{0.08}$ | 225 | 93 | A |
| Example 7 | $Li_{1.2}Ni_{0.16}Co_{0.08}Mn_{0.55}Ti_{0.01}O_{2.0}$ | $Li_{1.2}Ni_{0.16}Co_{0.08}Mn_{0.55}Ti_{0.01}O_{1.9}F_{0.08}P_{0.08}$ | 225 | 93 | A |
| Example 8 | $Li_{1.2}Ni_{0.16}Co_{0.08}Mn_{0.55}Mg_{0.01}O_{2.0}$ | $Li_{1.2}Ni_{0.16}Co_{0.08}Mn_{0.55}Mg_{0.01}O_{1.9}F_{0.08}P_{0.08}$ | 225 | 93 | A |
| Example 9 | $Li_{1.2}Ni_{0.16}Co_{0.08}Mn_{0.55}Nb_{0.01}O_{2.0}$ | $Li_{1.2}Ni_{0.16}Co_{0.08}Mn_{0.55}Nb_{0.01}O_{1.9}F_{0.08}P_{0.08}$ | 225 | 93 | A |
| Example 10 | $Li_{1.2}Ni_{0.16}Co_{0.08}Mn_{0.55}Ba_{0.01}O_{2.0}$ | $Li_{1.2}Ni_{0.16}Co_{0.08}Mn_{0.55}Ba_{0.01}O_{1.9}F_{0.08}P_{0.08}$ | 225 | 93 | A |
| Example 11 | $Li_{1.2}Ni_{0.16}Co_{0.08}Mn_{0.55}V_{0.01}O_{2.0}$ | $Li_{1.2}Ni_{0.16}Co_{0.08}Mn_{0.55}V_{0.01}O_{1.9}F_{0.08}P_{0.08}$ | 228 | 93 | A |
| Example 30 | $Li_{1.2}Ni_{0.16}Co_{0.08}Mn_{0.55}Fe_{0.01}O_{2.0}$ | $Li_{1.2}Ni_{0.16}Co_{0.08}Mn_{0.55}Fe_{0.01}O_{1.9}F_{0.08}P_{0.08}$ | 227 | 93 | A |

TABLE 3

| | Composition formula | | | cycle | |
|---|---|---|---|---|---|
| | (2): lithium compound (second precursor) | (1): active material | capacity mAh/g | characteristic % | evaluation |
| Example 29 | $Li_{1.2}Ni_{0.2}Mn_{0.6}O_{2.0}$ | $Li_{1.2}Ni_{0.2}Mn_{0.6}O_{1.9}F_{0.08}P_{0.08}$ | 218 | 90 | A |
| Example 12 | $Li_{1.2}Ni_{0.17}Co_{0.03}Mn_{0.6}O_{2.0}$ | $Li_{1.2}Ni_{0.17}Co_{0.03}Mn_{0.6}O_{1.9}F_{0.08}P_{0.08}$ | 230 | 93 | A |
| Example 13 | $Li_{1.2}Ni_{0.17}Co_{0.08}Mn_{0.55}O_{2.0}$ | $Li_{1.2}Ni_{0.17}Co_{0.08}Mn_{0.55}O_{1.9}F_{0.08}P_{0.08}$ | 230 | 93 | A |
| Example 14 | $Li_{1.2}Ni_{0.15}Co_{0.01}Mn_{0.55}O_{2.0}$ | $Li_{1.2}Ni_{0.15}Co_{0.01}Mn_{0.55}O_{1.9}F_{0.08}P_{0.08}$ | 220 | 93 | A |
| Example 15 | $Li_{1.2}Ni_{0.13}Co_{0.13}Mn_{0.54}O_{2.0}$ | $Li_{1.2}Ni_{0.13}Co_{0.13}Mn_{0.54}O_{1.9}F_{0.08}P_{0.08}$ | 215 | 93 | A |
| Example 16 | $Li_{1.2}Ni_{0.12}Co_{0.25}Mn_{0.43}O_{2.0}$ | $Li_{1.2}Ni_{0.12}Co_{0.25}Mn_{0.43}O_{1.9}F_{0.08}P_{0.08}$ | 215 | 93 | A |
| Comparative Example 17 | $Li_{1.2}Ni_{0.10}Co_{0.3}Mn_{0.4}O_{2.0}$ | $Li_{1.2}Ni_{0.10}Co_{0.3}Mn_{0.4}O_{1.9}F_{0.08}P_{0.08}$ | 210 | 85 | F |
| Comparative Example 3 | $Li_{1.2}Co_{0.3}Mn_{0.5}O_{2.0}$ | $Li_{1.2}Co_{0.3}Mn_{0.5}O_{1.9}F_{0.08}P_{0.08}$ | 180 | 88 | F |

Examples 19 to 24

In Examples 19 to 24, the temperature of the battery was adjusted to the value shown in Table 4 in the charging/discharging step for introducing P and F to the lithium compound (second precursor). Except for the this matter, a method similar to that of Example 1 was employed to produce the first precursors, the lithium compounds (second precursors), the active materials, and the lithium ion secondary batteries of Examples 19 to 24.

The composition and crystal structure of each of the second precursors and the active materials of Examples 19 to 24 were analyzed by a method similar to that of Example 1. The discharge capacity and the cycle characteristic of the batteries of Examples 19 to 24 were evaluated by a method similar to that of Example 1. The results are shown in Table 4.

It was confirmed that the composition of the second precursor of each example and the composition of the active material shown in Tables 1 to 4 were the same as those shown Tables 1 to 4. It was confirmed that the composition of the second precursor of each example was in the range of the following composition formula (2). It was confirmed that the composition of the active material of each example was in the range of the following composition formula (1). It was confirmed that the second precursor and the active material in each example had a layered structure.

$$Li_y Ni_a Co_b Mn_c M_d O_x \qquad (2)$$

In the above formula (2), the element M is at least one element selected from the group consisting of Al, Si, Zr, Ti, Fe, Mg, Nb, Ba and V, and $1.9 \leq (a+b+c+d+y) \leq 2.1$, $1.0 \leq y \leq 1.3$, $0 < a \leq 0.3$, $0 \leq b \leq 0.25$, $0.3 \leq c \leq 0.7$, $0 \leq d \leq 0.1$, and $1.90 \leq x \leq 2.05$ are satisfied.

$$Li_y Ni_a Co_b Mn_c M_d O_x F_{z1} P_{z2} \qquad (1)$$

In the above formula (1), the element M is at least one element selected from the group consisting of Al, Si, Zr, Ti, Fe, Mg, Nb, Ba and V, and $1.9 \leq (a+b+c+d+y) \leq 2.1$, $1.0 \leq y \leq 1.3$, $0 < a \leq 0.3$, $0 \leq b \leq 0.25$, $0.3 \leq c \leq 0.7$, $0 \leq d \leq 0.1$, $0.07 \leq z1 \leq 0.15$, $0.01 \leq z2 \leq 0.1$, and $1.9 \leq (x+z1) \leq 2.1$ are satisfied.

TABLE 4

| | Composition formula | | temperature | capacity | cycle characteristic | evaluation |
|---|---|---|---|---|---|---|
| | (2): lithium compound | (1): active material | °C. | mAh/g | % | |
| Example 23 | $Li_{1.2}Ni_{0.17}Co_{0.08}Mn_{0.55}O_{2.0}$ | $Li_{1.2}Ni_{0.17}Co_{0.08}Mn_{0.55}O_{1.9}F_{0.07}P_{0.04}$ | −5 | 215 | 88 | A |
| Example 19 | $Li_{1.2}Ni_{0.17}Co_{0.08}Mn_{0.55}O_{2.0}$ | $Li_{1.2}Ni_{0.17}Co_{0.08}Mn_{0.55}O_{1.9}F_{0.08}P_{0.06}$ | 0 | 220 | 93 | A |
| Example 20 | $Li_{1.2}Ni_{0.17}Co_{0.08}Mn_{0.55}O_{2.0}$ | $Li_{1.2}Ni_{0.17}Co_{0.08}Mn_{0.55}O_{1.9}F_{0.08}P_{0.07}$ | 10 | 230 | 92 | A |
| Example 1 | $Li_{1.2}Ni_{0.17}Co_{0.08}Mn_{0.55}O_{2.0}$ | $Li_{1.2}Ni_{0.17}Co_{0.08}Mn_{0.55}O_{1.9}F_{0.08}P_{0.08}$ | 25 | 230 | 92 | A |
| Example 21 | $Li_{1.2}Ni_{0.17}Co_{0.08}Mn_{0.55}O_{2.0}$ | $Li_{1.2}Ni_{0.17}Co_{0.08}Mn_{0.55}O_{1.9}F_{0.09}P_{0.08}$ | 30 | 230 | 92 | A |
| Example 22 | $Li_{1.2}Ni_{0.17}Co_{0.08}Mn_{0.55}O_{2.0}$ | $Li_{1.2}Ni_{0.17}Co_{0.08}Mn_{0.55}O_{1.9}F_{0.11}P_{0.09}$ | 40 | 220 | 93 | A |
| Example 24 | $Li_{1.2}Ni_{0.17}Co_{0.08}Mn_{0.55}O_{2.0}$ | $Li_{1.2}Ni_{0.17}Co_{0.08}Mn_{0.55}O_{1.9}F_{0.12}P_{0.09}$ | 50 | 215 | 92 | A |

Moreover, it was confirmed that the battery of any example had a discharge capacity of 215 mAh/g or more and a cycle characteristic of 88% or more.

It was confirmed that the second precursor and the active material of each comparative example had a layered structure. However, it was confirmed that the composition of the active material of any comparative example was out of the range of the composition formula (1). As a result, it was confirmed that the battery of any comparative example had a capacity of less than 215 mAh/g or a cycle characteristic of less than 88%.

From the comparison between Examples 19 to 22 and Examples 23 and 24 in Table 4, it was confirmed that the capacity and cycle characteristic of the battery were improved by maintaining the temperature of the battery in the charging/discharging step at 0 to 40° C.

DESCRIPTION OF REFERENCE SIGNS

10 POSITIVE ELECTRODE
20 NEGATIVE ELECTRODE
12 POSITIVE ELECTRODE CURRENT COLLECTOR
14 POSITIVE ELECTRODE ACTIVE MATERIAL LAYER
18 SEPARATOR
22 NEGATIVE ELECTRODE CURRENT COLLECTOR
24 NEGATIVE ELECTRODE ACTIVE MATERIAL LAYER
30 POWER GENERATION ELEMENT
50 CASE
60, 62 LEAD
100 LITHIUM ION SECONDARY BATTERY

The invention claimed is:

1. An active material having a layered structure and represented by the following composition formula (1):

$$Li_yNi_aCo_bMn_cM_dO_xF_{z1}P_{z2} \quad (1)$$

wherein:
M is at least one element selected from the group consisting of Al, Si, Zr, Ti, Fe, Mg, Nb, Ba and V, and
$1.9 \leq (a+b+c+d+y) \leq 2.1$,
$1.0 \leq y \leq 1.3$,
$0 < a \leq 0.3$,
$0 \leq b \leq 0.25$,
$0.3 \leq c \leq 0.7$,
$0 \leq d \leq 0.1$,
$0.07 \leq z1 \leq 0.15$,
$0.01 \leq z2 \leq 0.1$, and
$1.9 \leq (x+z1) \leq 2.1$ are satisfied.

2. A lithium ion secondary battery comprising:
a positive electrode having a positive electrode current collector and a positive electrode active material layer containing a positive electrode active material;
a negative electrode having a negative electrode current collector and a negative electrode active material layer containing a negative electrode active material;
a separator disposed between the positive electrode active material layer and the negative electrode active material layer; and
an electrolyte in contact with the negative electrode, the positive electrode, and the separator,
wherein the positive electrode active material includes the active material according to claim 1.

3. The lithium ion secondary battery according to claim 2, wherein the electrolyte is a nonaqueous electrolyte in which $LiPF_6$ is dissolved.

4. A method for manufacturing the active material according to claim 1, the method comprising forming the active material from a lithium compound by
disposing the lithium compound on a surface of a positive electrode of a lithium ion secondary battery including a nonaqueous electrolyte in which $LiPF_6$ is dissolved; and
charging/discharging the lithium ion secondary battery once or multiple times, wherein:
the lithium compound has a layered structure and is represented by the following composition formula (2):

$$Li_yNi_aCo_bMn_cM_dO_x \quad (2)$$

M is at least one element selected from the group consisting of Al, Si, Zr, Ti, Fe, Mg, Nb, Ba and V, and
$1.9 \leq (a+b+c+d+y) \leq 2.1$,
$1.0 \leq y \leq 1.3$,
$0 < a \leq 0.3$,
$0 \leq b \leq 0.25$,
$0.3 \leq c \leq 0.7$,
$0 \leq d \leq 0.1$, and
$1.90 \leq x \leq 2.05$ are satisfied.

5. The method according to claim 4, wherein a temperature of the lithium ion secondary battery at a time of charging/discharging is maintained at 0 to 40° C.

* * * * *